United States Patent
Wang et al.

(10) Patent No.: US 9,444,867 B2
(45) Date of Patent: Sep. 13, 2016

(54) SYSTEMS AND METHODS FOR DATA SYNCHRONIZATION IN A NETWORK APPLICATION

(71) Applicant: Tencent Technology (Shenzhen) Company Limited, Shenzhen (CN)

(72) Inventors: Xuxin Wang, Shenzhen (CN); Jianhui Yao, Shenzhen (CN); Xianwen Chen, Shenzhen (CN); Wen Tang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 268 days.

(21) Appl. No.: 14/079,578

(22) Filed: Nov. 13, 2013

(65) Prior Publication Data

US 2014/0067928 A1 Mar. 6, 2014

Related U.S. Application Data

(63) Continuation of application No. PCT/CN2013/081791, filed on Aug. 19, 2013.

(30) Foreign Application Priority Data

Aug. 21, 2012 (CN) .......................... 2012 1 0297918

(51) Int. Cl.
G06F 13/00 (2006.01)
H04L 29/06 (2006.01)
G06F 9/44 (2006.01)

(52) U.S. Cl.
CPC ........... *H04L 65/602* (2013.01); *G06F 9/4443* (2013.01)

(58) Field of Classification Search
CPC .................. H04L 29/06401; H04L 29/06387; H04L 29/06394; H04L 29/06176; H04L 65/4015; H04L 65/40; H04L 65/4007; H04L 65/602; G06F 9/4443
USPC ................ 709/204–207, 203, 201, 220–222; 715/753–759; 707/620–623
See application file for complete search history.

(56) References Cited

U.S. PATENT DOCUMENTS

| | | | |
|---|---|---|---|
| 2007/0198744 A1* | 8/2007 | Wensley | H04L 12/1827 709/248 |
| 2008/0133551 A1* | 6/2008 | Wensley | G06F 21/10 |
| 2008/0133736 A1* | 6/2008 | Wensley | G06Q 10/10 709/224 |
| 2008/0280676 A1 | 11/2008 | Distanik et al. | |
| 2009/0193345 A1* | 7/2009 | Wensley | H04L 65/4015 715/756 |

FOREIGN PATENT DOCUMENTS

| | | |
|---|---|---|
| CN | 1431819 A | 7/2003 |
| CN | 1567822 A | 1/2005 |
| CN | 1941788 A | 4/2007 |
| CN | 101330418 A | 12/2008 |
| CN | 101420347 A | 4/2009 |
| CN | 102158633 A | 8/2011 |

OTHER PUBLICATIONS

Tencent Technology, ISRWO, PCT/CN2013/081791, Nov. 21, 2013, 9 pgs.
Tencent Technology, IPRP, PCT/CN2013/081791, Feb. 24, 2015, 4 pgs.

* cited by examiner

*Primary Examiner* — Kenneth R Coulter
(74) *Attorney, Agent, or Firm* — Morgan, Lewis & Bockius LLP

(57) ABSTRACT

A computer receives user input events associated with a network application. Each user input event corresponds to a respective image frame of the network application and the user input events include at least one remote user input event from a remote source. The computer generates and updates response data from the respective image frames associated with the user input events to a current image frame of the network application. In some embodiments, the user input events are all from a local user of the computer. The computer also generates and updates synchronization data from the respective image frame associated with the at least one remote user input event to the current image frame of the network application. Finally, the computer replaces the response data with the synchronization data.

12 Claims, 7 Drawing Sheets

SYSTEMS AND METHODS FOR DATA SYNCHRONIZATION IN A NETWORK APPLICATION

RELATED APPLICATIONS

This application is a continuation application of PCT Patent Application No. PCT/CN2013/081791, entitled "Systems and Methods for Data Synchronization in a Network Application," filed on Aug. 19, 2013, which claims priority to Chinese Patent Application No. 201210297918.8, "Systems and Methods for Data Synchronization in a Network Application," filed on Aug. 21, 2012, both of which are hereby incorporated by reference in their entirety.

FIELD OF THE INVENTION

The present invention generally relates to Internet technology, in particular to a network application method and apparatus for data synchronization.

BACKGROUND OF THE INVENTION

With the development of the Internet, network applications are also booming on the Internet, users could achieve data exchange through a variety of network applications running on different networks. Specifically, among a plurality of users running the same network application, each user can use the network interface provided by the network application to trigger the various operation instructions. The network application server will handle the received operation instructions and generate the appropriate data. Then based on the generated operation data, the network application server return the user-triggered operations as feedback on different user interfaces of the application. For example, if the network application is a game application, two users play the game application and exchange information with each other using the Internet. When one user triggers the movement of a character in the game application through any application interface, the game character will move accordingly. The game application server will then forward the character movement command to the other network application used by another user, thereby enabling the corresponding character movement on the user interface. However, since different network applications have different network environments, if a network application's network environment is poor or if there is great volatility of the network environment, they may prevent the appropriate data synchronization of different network applications.

SUMMARY

The above deficiencies and other problems associated with network environment fluctuations are reduced or eliminated by the invention disclosed below. In some embodiments, the invention is implemented in a computer system that has one or more processors, memory and one or more modules, programs or sets of instructions stored in the memory for performing multiple functions. Instructions for performing these functions may be included in a computer program product configured for execution by one or more processors.

One aspect of the invention involves a computer-implemented method performed by a computer system. The computer system receives user input events associated with a network application. Each user input event corresponds to a respective image frame of the network application and the user input events include at least one remote user input event from a remote source. The computer generates and updates response data from the respective image frames associated with the user input events to a current image frame of the network application. In some embodiments, the user input events are all from a local user of the computer. The computer also generates and updates synchronization data from the respective image frame associated with the at least one remote user input event to the current image frame of the network application. Finally, the computer replaces the response data with the synchronization data.

Another aspect of the invention involves a computer system. The computer system includes one or more processors, memory, and one or more program modules stored in the memory and configured for execution by the one or more processors. The one or more program modules include: a user input events receive module configured to receive user input events associated with a network application, wherein each user input event corresponds to a respective image frame of the network application and the user input events include at least one remote user input event from a remote source; a local response data update module configured to generate and update response data from the respective image frames associated with the user input events to a current image frame of the network application; a remote data synchronization module configured to generate and update synchronization data from the respective image frame associated with the at least one remote user input event to the current image frame of the network application; and a data replacement module configured to replace the response data with the synchronization data.

Another aspect of the invention involves a non-transitory computer readable storage medium having stored therein one or more instructions, which when executed by a computer system cause the computer system to: receive user input events associated with a network application, wherein each user input event corresponds to a respective image frame of the network application and the user input events include at least one remote user input event from a remote source; generate and update response data from the respective image frames associated with the user input events to a current image frame of the network application; generate and update synchronization data from the respective image frame associated with the at least one remote user input event to the current image frame of the network application; and replace the response data with the synchronization data.

Some embodiments may be implemented on either the client side or the server side of a client-server network environment.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Figure 8:
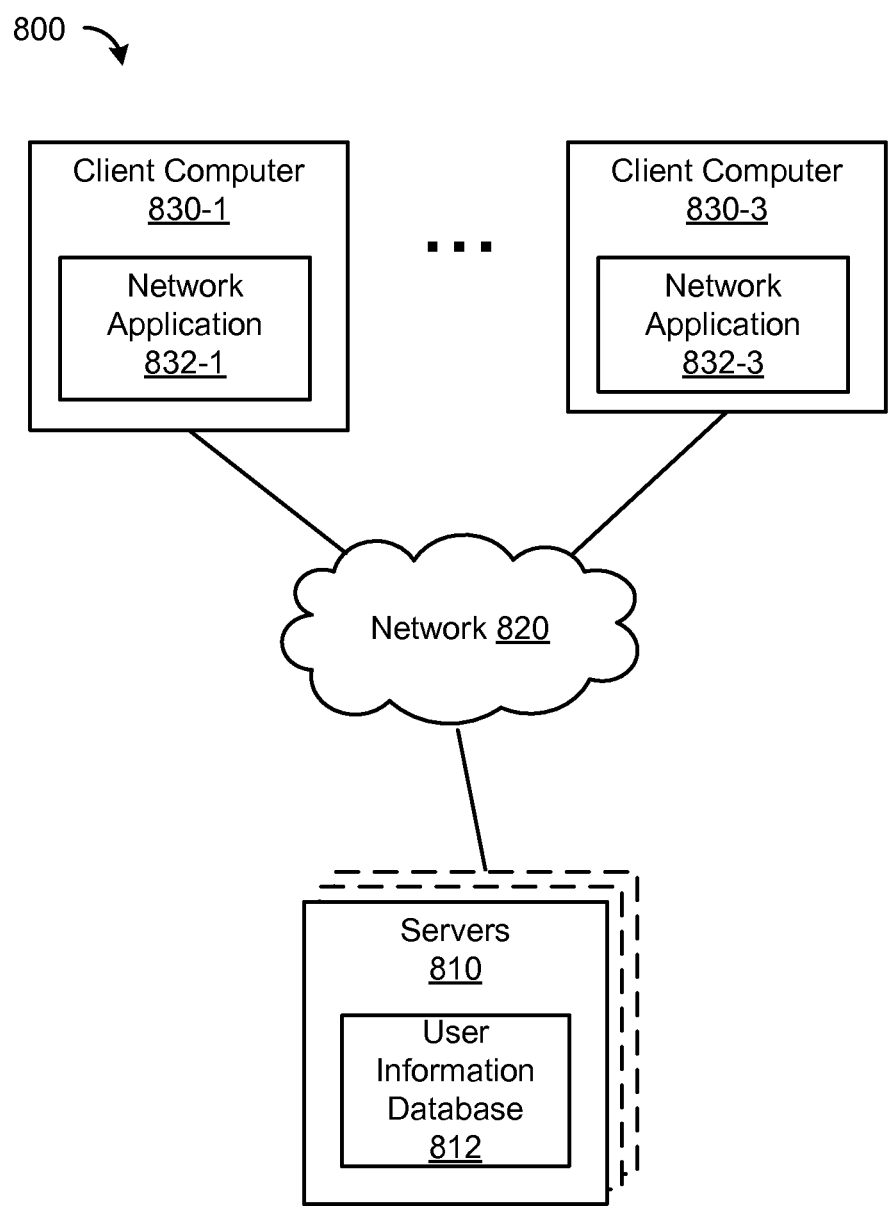
FIG. 8 is a block diagram of a network environment in accordance with some embodiments.

FIG. 8 is a block diagram of a network environment in accordance with some embodiments. The network environment 800 includes one or more client computers (830-1, 830-3) and one or more servers 810. The client computers are connected to the servers via a network 820 (e.g., the Internet). Meanwhile different client computer may also be able to communicate with each other via the network 820. For example, as described below, the user input events generated at the client computer 830-1 may be transmitted to the server 810 and/or the client computer 830-2. Through the network 810, different entities in the network environment 800 can exchange information with each other. In some embodiments, the network environment 800 supports an on-line game application. Different users participate in the on-line game application from different client computers. The server 810 includes a user information database 812 for storing information of the users including, but not limited to, a user identifier, a password, a user account balance, a current user status (e.g., the last input by the user), etc.

Figure 1:
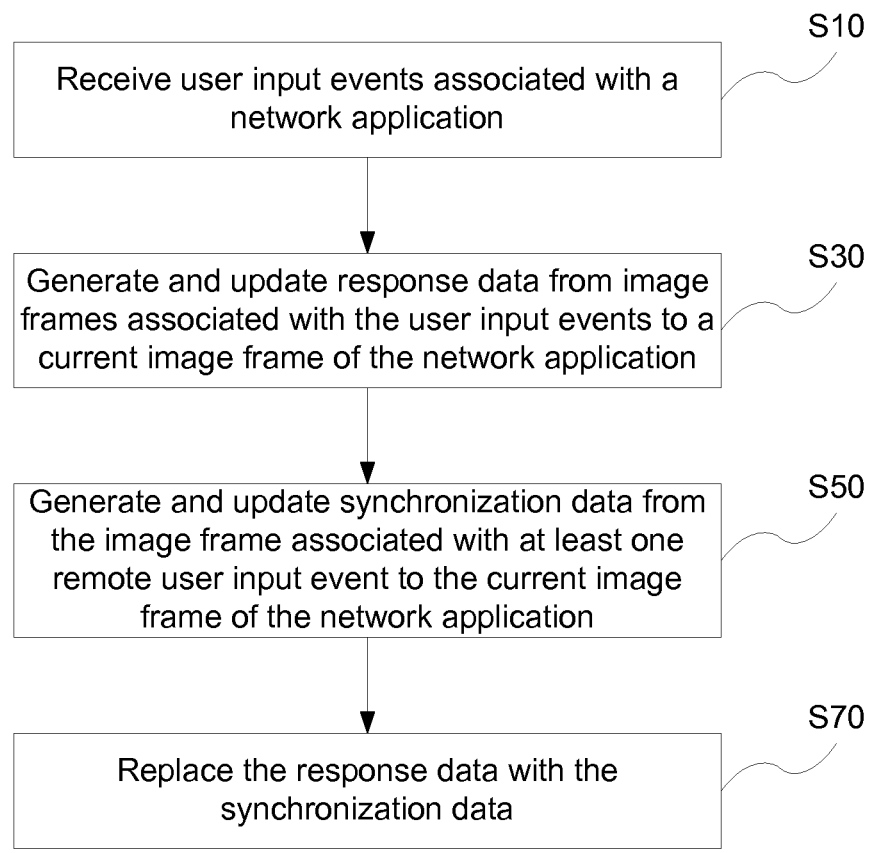
FIG. 1 is a flowchart illustrative of how a network application handles different types of user input events in accordance with some embodiments.

FIG. 1 is a flowchart illustrative of how a network application handles different types of user input events in accordance with some embodiments. For illustrative purpose, the network application is an on-line game application running at one of the client computers shown in FIG. 8. At step S10, the computer receives user input events associated with the network application. The user input events include both local user input events from the computer as well as remote user input events from remote computers. The local user input events are generated by a user of the computer or trigged by an action of the user. For example, when the user moves the mouse or presses a keystroke, a local user input event may be generated accordingly. Similarly, the movement of a mouse by a second user at a second client computer that is currently running the same network application first generates a local user input event at the second client computer and the local user input event is then transmitted to the client computer through the network 810, which may be deemed to be a remote user input event. Such user input events may cause the movement of an object on the graphical user interface of the network application. Ideally, the movement of the same object on different graphical user interfaces at different computers should happen nearly simultaneously. But in reality, it may take different amount of time for the same user input event to arrive at different client computers due to the potential network congestions, which may result in a downgrade in user experience. Therefore, one function of the present invention is to improve the synchronization between the movements of objects controlled by different users on different graphical user interfaces. In some embodiments, each user input event received by the computer corresponds to a respective image frame of the network application, which indicates when the event was captured by the network application, and the user input events include at least one remote user input event from a remote source.

At step S30, the computer generates and updates response data from image frames associated with the user input events to a current image frame of the network application. In some embodiments, upon receipt of a local user input event (or a user input invent from a nearby computer that has little delay), the computer determines an initial image frame associated with the user input event and then generates the response data associated with the initial image frame. For example, the response data may include information about how a particular object moves on the graphical user interface across different image frames. If the initial image frame is different from the current image frame, the computer then updates the response data accordingly. As described below, the response data is used for rendering the current image frame on the graphical user interface. In some embodiments, the computer updates the response data corresponding to the respective image frames associated with the user input events at a first frame rate, e.g., 60 frames per second, which is usually the default frame rate of the network application. Because the graphical user interface is rendered frame by frame, the update to the response data is also performed on a frame-by-frame basis. Each time there is an update to the response data, the corresponding image frame is also re-rendered using the updated response data such that the computer can respond to the user inputs almost instantaneously. This process is performed continuously and repeatedly such that whenever there is a new user input event (e.g., a local user input event), the computer will update the response data such that the network application is always in synch with the user's instructions.

As noted above, the local user input event at one computer may become a remote user input event at another computer. Similarly, the user input events arriving at the computer may also include remote user input events, which may be out-of-synch with the local current status of the network application at the computer. Therefore, at step S50, the computer also generates and updates synchronization data from the image frame associated with at least one remote user input event to the current image frame of the network application. Like the update to the response data, the update to the synchronization data is also performed on a frame-by-frame basis until the number of updates to the response data is the same as the number of updates to the synchronization data. In some embodiments, the synchronization data cannot be used for rendering the current image frame. Instead, at step S70, the computer first replaces the response data, which has already been used for rendering the current graphical user interface, with the synchronization data by, e.g., storing the synchronization data in the data structure for storing the response data. In some embodiments, the computer then uses the synchronization data to render the graphical user interface of the network application. By applying the synchronization data to the network application, the instance of the network application running at the computer is kept in synch with other instances of the same network application running at other computers such that the users at different client computers can play the same game with each other in a synchronized fashion.

In some embodiments, the response data is deemed to be immune from the network environment (e.g., network congestions). Regardless of whether a user input event arriving at a computer is local or remote, the computer will act quickly by updating the response data and use the updated response data to render the current image frame. But for a remote user input event that comes from a client computer where there is a significant delay, the computer cannot update the response data based on the remote user input event because the source client computer may have already updated its own response data before the arrival of the remote user input event. Instead, the computer uses the remote user input event to update its synchronization data, which effectively measures a gap between an image frame associated with the remote user input event and the current image frame of the network application. The synchronization data is then updated repeatedly (e.g., frame by frame) until it corresponds to the same image frame as the response data. Finally, the computer uses the updated synchronization data to render the image frame such that different users can exchange data with each other using the same network application synchronously.

Figure 2:
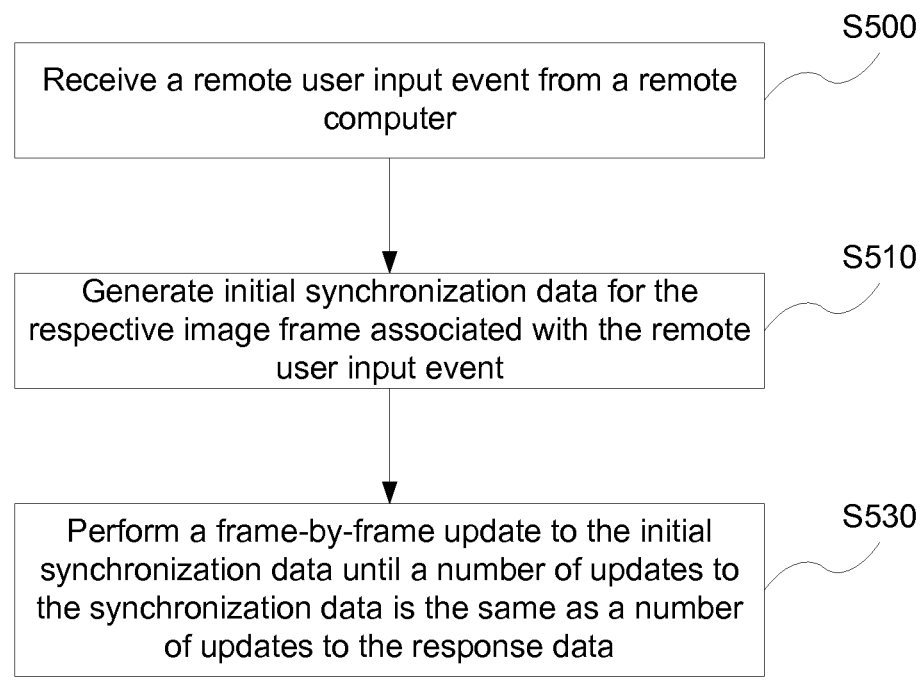
FIG. 2 is a flowchart illustrative of how the network application processes remote user input events from a remote computer in accordance with some embodiments.

FIG. 2 is a flowchart illustrative of how the network application processes remote user input events from a remote computer in accordance with some embodiments. At step S500, the computer receives a remote user input event from a remote computer. Note that the remote user input event is assumed to be out-of-synch with computer and therefore cannot be used for updating the response data directly. In response, at step S510, the computer generates initial synchronization data for the respective image frame associated with the remote user input event. For example, if this is the first time that the computer receives a remote user input event from that remote computer, the computer may need to generate the initial synchronization data corresponding to the image frame associated with the remote user input event. Next, at step S530, the computer performs a frame-by-frame update to the initial synchronization data until a number of updates to the synchronization data is the same as a number of updates to the response data and then replaces the response data with the synchronization data.

For example, it is assumed that the computer receives a remote user input event and the remote user input event corresponds to the Nth image frame of the network application and the response data corresponds to the (N+M)th image frame (M≥0). In other words, the two computers are currently out of synchronization. Therefore, the computer needs to quickly update the synchronization data to the (N+M)th image frame so as to bring the two computer back in synch again.

Figure 3:
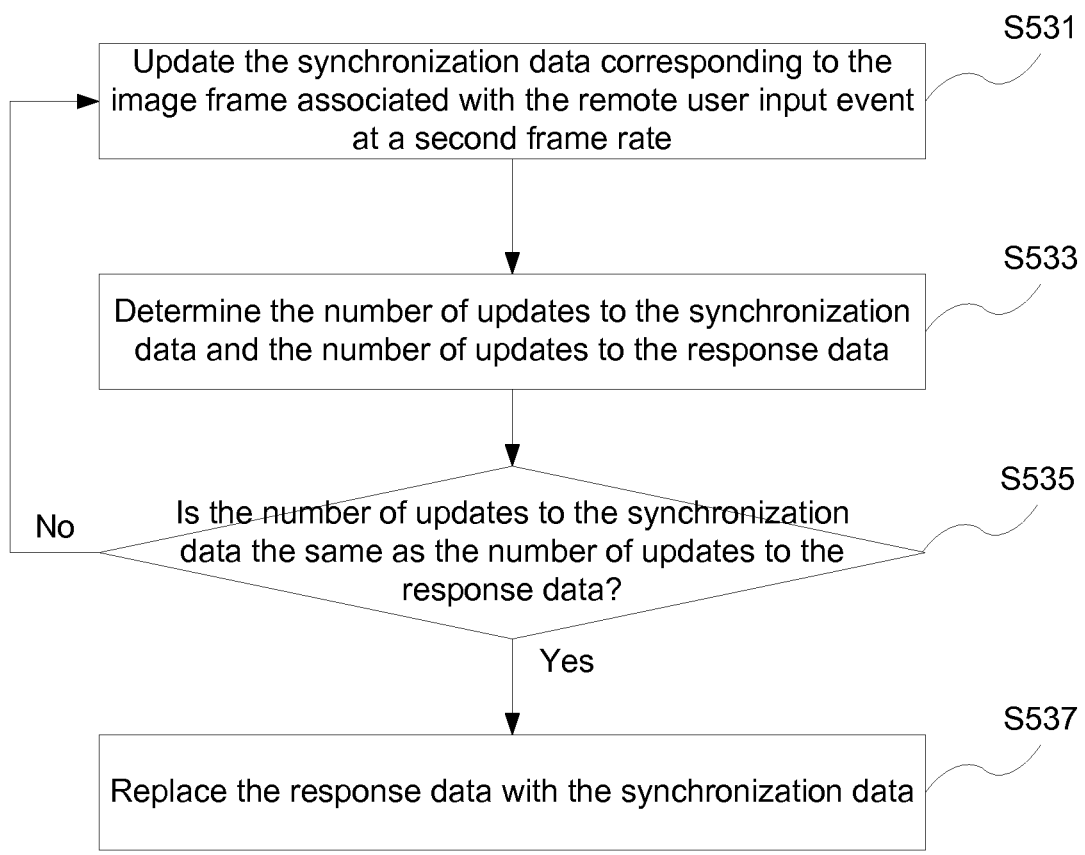
FIG. 3 is a flowchart illustrative of how the network application updates the synchronization data based on the response data in accordance with some embodiments.

FIG. 3 is a flowchart illustrative of how the network application updates the synchronization data to be in synch with the response data in accordance with some embodiments. At step S531, the computer updates the synchronization data corresponding to the image frame associated with the remote user input event at a second frame rate (e.g., 90 or 120 frames per second), which is usually greater than the first frame rate used by the computer for updating the response data. If not, the synchronization data will never be able to back in synch with the response data. At step S533, the computer determines the number of updates to the synchronization data and the number of updates to the response data. At step S535, the computer determines whether the number of updates to the synchronization data is the same as the number of updates to the response data. If so (Yes), at step S537, the computer then replaces the response data with the updated synchronization data. If not (No), the computer then returns to update the synchronization data at step S531.

Note that in the approach described above, the generation and update of the response data and the generation and update of the synchronization data are independent from each other because they are generated by different users at different computers using the same network application. However, when the update to the synchronization data satisfies the predefined condition, the synchronization data may be brought back in synchronization with the response data and therefore improve the user experience of the network application.

Figure 4:
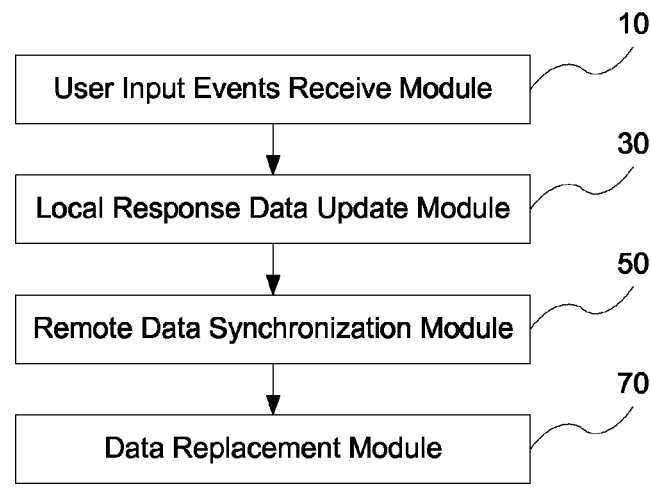
FIG. 4 is a block diagram illustrative of modules in the network application for handling different types of user input events in accordance with some embodiments.

FIG. 4 is a block diagram illustrative of modules in the network application for handling different types of user input events in accordance with some embodiments. In particular, the user input events receive module 10 is configured to receive user input events associated with the network application. The user input events include both local user input events from the computer as well as remote user input events from remote computers. The local user input events are generated by a user of the computer or trigged by an action of the user. For example, when the user moves the mouse or presses a keystroke, a local user input event may be generated accordingly. Similarly, the movement of a mouse by a second user at a second client computer that is currently running the same network application first generates a local user input event at the second client computer and the local user input event is then transmitted to the client computer through the network 810, which may be deemed to be a remote user input event. Such user input events may cause the movement of an object on the graphical user interface of the network application. Ideally, the movement of the same object on different graphical user interfaces at different computers should happen nearly simultaneously. But in reality, it may take different amount of time for the same user input event to arrive at different client computers due to the potential network congestions, which may result in a downgrade in user experience. Therefore, one function of the present invention is to improve the synchronization between the movements of objects controlled by different users on different graphical user interfaces. In some embodiments, each user input event received by the user input events receive module 10 corresponds to a respective image frame of the network application, which indicates when the event was captured by the network application, and the user input events include at least one remote user input event from a remote source.

The local response data update module 30 is configured to generate and update response data from image frames associated with the user input events to a current image frame of the network application. In some embodiments, upon receipt of a local user input event (or a user input invent from a nearby computer that has little delay), the local response data update module 30 determines an initial image frame associated with the user input event and then generates the response data associated with the initial image frame. For example, the response data may include information about how a particular object moves on the graphical user interface across different image frames. If the initial image frame is different from the current image frame, the local response data update module 30 then updates the response data accordingly. As described below, the response data is used for rendering the current image frame on the graphical user interface. In some embodiments, the local response data update module 30 updates the response data corresponding to the respective image frames associated with the user input events at a first frame rate, e.g., 60 frames per second, which is usually the default frame rate of the network application. Because the graphical user interface is rendered frame by frame, the update to the response data is also performed on a frame-by-frame basis. Each time there is an update to the response data, the corresponding image frame is also re-rendered using the updated response data such that the computer can respond to the user inputs almost instantaneously. This process is performed continuously and repeatedly such that whenever there is a new user input event (e.g., a local user input event), the computer will update the response data such that the network application is always in synch with the user's instructions.

The remote data synchronization module 50 is configured to generate and update synchronization data from the image frame associated with at least one remote user input event to the current image frame of the network application. Like the update to the response data, the update to the synchronization data is also performed on a frame-by-frame basis by the remote data synchronization module 50 until the number of updates to the response data is the same as the number of updates to the synchronization data. In some embodiments, the synchronization data cannot be used for rendering the current image frame. Instead, the remote data synchronization module 50 provides the update synchronization data to a data replacement module 70, which is configured to first replace the response data with the synchronization data by, e.g., storing the synchronization data in the data structure for storing the response data. In some embodiments, an image rendition module (not shown in FIG. 4) uses the synchronization data to render the graphical user interface of the network application. By applying the synchronization data to the network application, the instance of the network application running at the computer is kept in synch with other instances of the same network application running at other computers such that the users at different client computers can play the same game with each other in a synchronized fashion.

In some embodiments, the response data is deemed to be immune from the network environment (e.g., network congestions). Regardless of whether a user input event arriving at a computer is local or remote, the computer will act quickly by updating the response data and use the updated response data to render the current image frame. But for a remote user input event that comes from a client computer where there is a significant delay, the computer cannot update the response data based on the remote user input event because the source client computer may have already updated its own response data before the arrival of the remote user input event. Instead, the computer uses the remote user input event to update its synchronization data, which effectively measures a gap between an image frame associated with the remote user input event and the current image frame of the network application. The synchronization data is then updated repeatedly (e.g., frame by frame) until it corresponds to the same image frame as the response data. Finally, the computer uses the updated synchronization data to render the image frame such that different users can exchange data with each other using the same network application synchronously.

Figure 5:
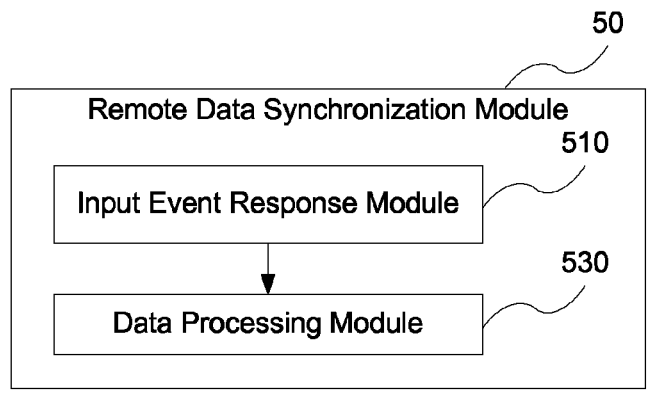
FIG. 5 is a block diagram illustrative of a remote data synchronization module in the network application in accordance with some embodiments.

FIG. 5 is a block diagram illustrative of a remote data synchronization module in the network application in accordance with some embodiments. In this example, the remote data synchronization module 50 further includes an input event response module 510 and a data processing module 530. For example, the input event response module 510 is configured to receive a remote user input event from a remote computer and generate initial synchronization data for the respective image frame associated with the remote user input event. For example, the remote user input event is assumed to be out-of-synch with computer and therefore cannot be used for updating the response data directly. If this is the first time that the computer receives a remote user input event from that remote computer, the computer may need to generate the initial synchronization data corresponding to the image frame associated with the remote user input event. The data processing module 530 is configured to perform a frame-by-frame update to the initial synchronization data until a number of updates to the synchronization data is the same as a number of updates to the response data and then replaces the response data with the synchronization data.

For example, it is assumed that the computer receives a remote user input event and the remote user input event corresponds to the Nth image frame of the network application and the response data corresponds to the (N+M)th image frame (M≥0). In other words, the two computers are currently out of synchronization. Therefore, the computer needs to quickly update the synchronization data to the (N+M)th image frame so as to bring the two computer back in synch again.

Figure 6:
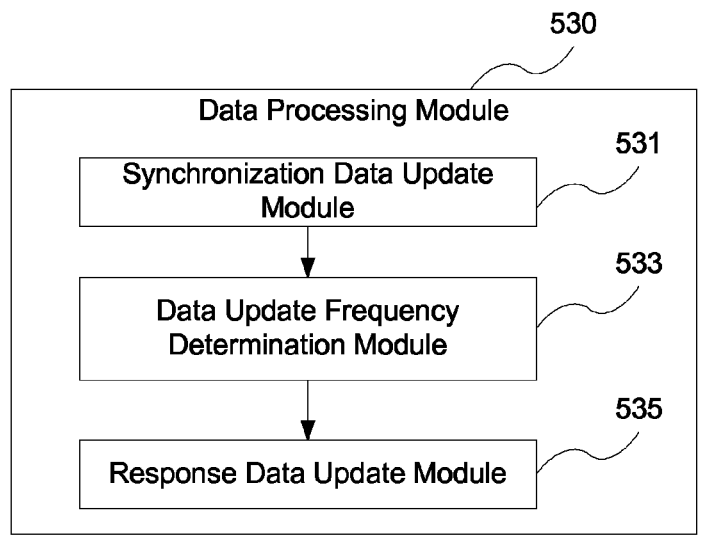
FIG. 6 is a block diagram illustrative of a data processing module in the network application in accordance with some embodiments.

FIG. 6 is a block diagram illustrative of a data processing module in the network application in accordance with some embodiments. In this example, the data processing module 530 further includes a synchronization data update module 531, a data update frequency determination module 533, and a response data update module 535. For example, the synchronization data update module 531 is configured to update the synchronization data corresponding to the image frame associated with the remote user input event at a second frame rate (e.g., 90 or 120 frames per second), which is usually greater than the first frame rate used by the computer for updating the response data. The data update frequency determination module 533 is configured to determine the number of updates to the synchronization data and the number of updates to the response data. The response data update module 535 is configured to determine whether the number of updates to the synchronization data is the same as the number of updates to the response data. If so, the response data update module 535 then replaces the response data with the updated synchronization data. If not, the response data update module 535 then notifies the synchronization data update module 531 to update the synchronization data.

Note that in the approach described above, the local response data update module 30 and the remote data synchronization module 50 operate independently from each other because they are generated by different users at different computers using the same network application. However, when the update to the synchronization data satisfies the predefined condition, the synchronization data may be brought back in synchronization with the response data and therefore improve the user experience of the network application. In some embodiments, the response data update module 30 is located at a client computer while the remote data synchronization module 50 is located at the server 810. In some other embodiments, both the response data update module 30 and the remote data synchronization module 50 may be located at the server 810.

Figure 7:
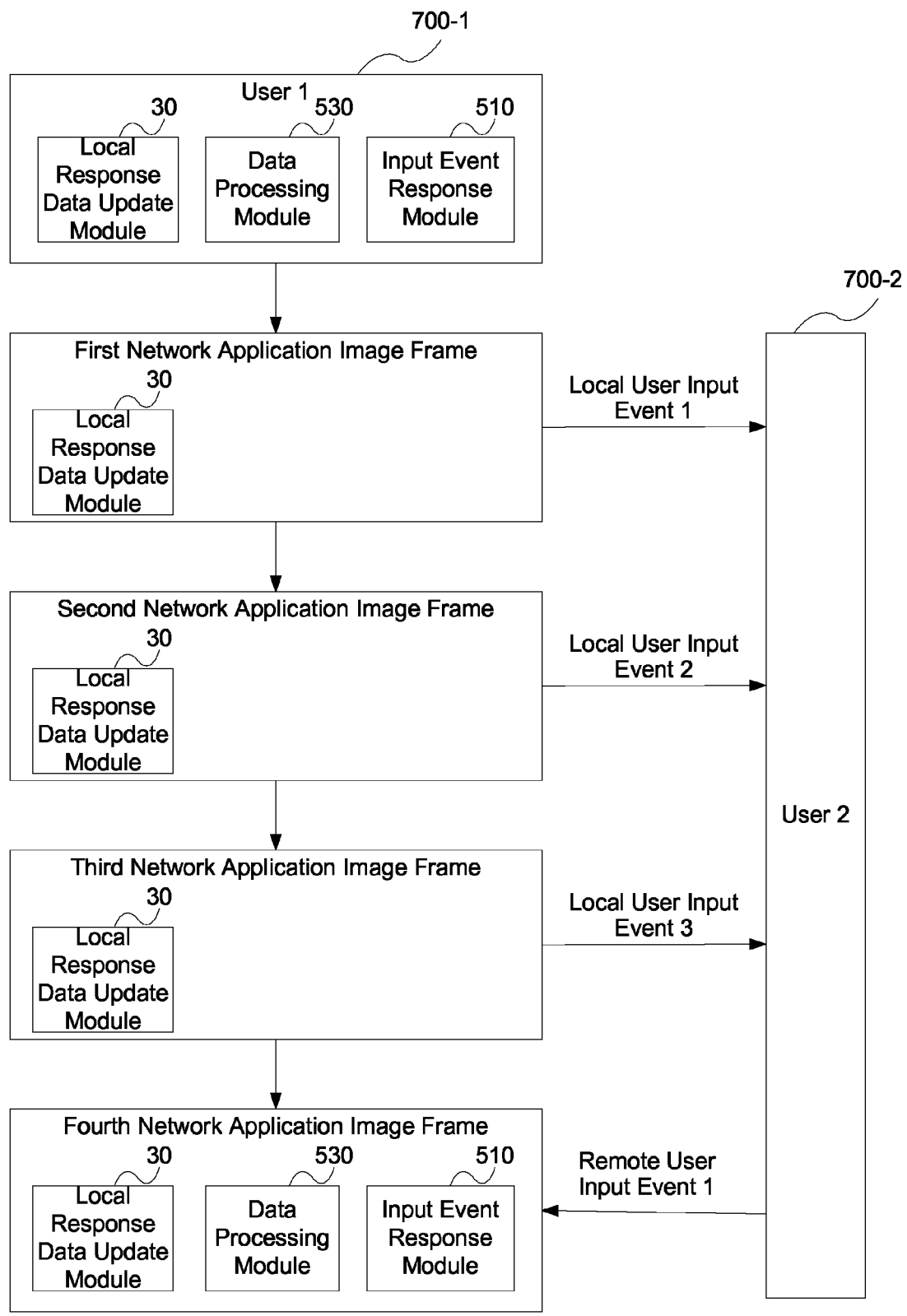
FIG. 7 is a block diagram illustrative of how computers associated with two users of the network application synchronize user input events with each other in accordance with some embodiments.

FIG. 7 is a block diagram illustrative of how computers associated with two users of the network application synchronize user input events with each other in accordance with some embodiments. In this example, the user 1 (700-1) may use a local computer to exchange information with the user 2 (700-2) that uses another computer. For example, the two users may play an on-line game application. For example, the computer associated with the user 1 may include a user input events receive module 10 for receiving different types of user input events. For the received user input events, the local response data update module 30 is responsible for processing local user input events from the user 1 (e.g., generating and updating response data associated with the local user input events). Within the remote data synchronization module 50, the input event response module 510 and the data processing module 530 are responsible for processing remote user input events (that may be out of synch with the local user input events) and keeping the different computers running the same network application in synch with each other.

In this example, the computer associated with the user 1 receives three local input events triggered by the user 1, local user input event 1, local user input event 2, and local user input event 3, which are respectively associated with three different image frames of the network application. As noted above, for each user input event, the local response data update module 30 is triggered to generate and update response data and use the response data to render the respective image frames. When the network application renders the fourth image frame, a remote user input event from the computer associated with the user 2 arrives at the computer. This event triggers the input event response module 510 of the computer to generate the synchronization data based on the local user input event 1 and the remote user input event 1. The data processing module 530 then updates the synchronization data from the first image frame to the second, the third, and the fourth image frame such that the synchronization data is updated the same number of times like the response data. Finally, the synchronization data is stored in the data structure for storing the response data and then used for rendering the fourth image frame accordingly such that the fourth image frame at the computer associated with the user 1 is in synchronization with the corresponding image frame at the computer associated with the user 2. Note that the computer associated with the user 2 processes the three local user input events in substantially the same manner if they arrive at the computer with a substantial delay such that they cannot be used for updating the response data.

Figure 9:
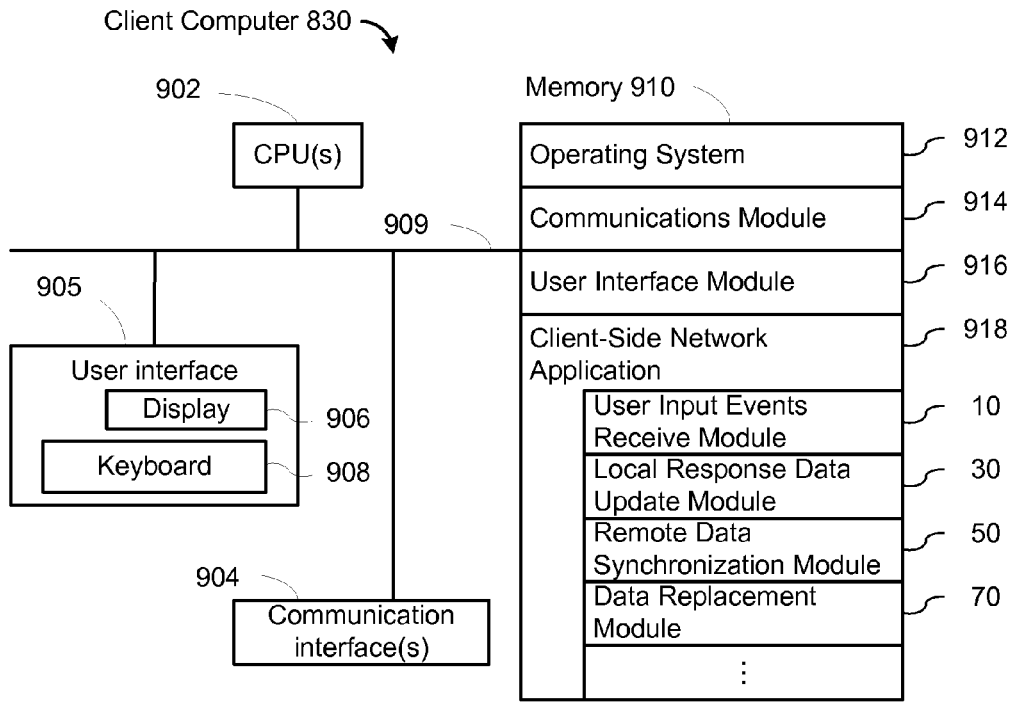
FIG. 9 is a block diagram of an exemplary client computer in accordance with some embodiments.

FIG. 9 is a block diagram of an exemplary client computer in accordance with some embodiments. The exemplary client computer 830 typically includes one or more processing units (CPU's) 902, one or more network or other communications interfaces 904, memory 910, and one or more communication buses 909 for interconnecting these components. The communication buses 909 may include circuitry (sometimes called a chipset) that interconnects and controls communications between system components. The client computer 830 may include a user input device 905, for instance, a display 906 and a keyboard 908. Memory 910 may include high speed random access memory and may also include non-volatile memory, such as one or more magnetic disk storage devices. Memory 910 may include mass storage that is remotely located from the CPU's 902. In some embodiments, memory 910 stores the following programs, modules and data structures, or a subset or superset thereof:

- an operating system 912 that includes procedures for handling various basic system services and for performing hardware dependent tasks;
- a network communication module 914 that is used for connecting the client computer 830 to the server 810 or other computers via one or more communication networks (wired or wireless), such as the Internet, other wide area networks, local area networks, metropolitan area networks, and so on;
- a user interface module 916 configured to receive user inputs through the user interface 905; and
- one or more client-side network applications 918, each network application further including a user input events receive module 10, a local response data update module 30, a remote data synchronization module 50, and a data replacement module 70 as described above in connection with FIG. 4.

Figure 10:
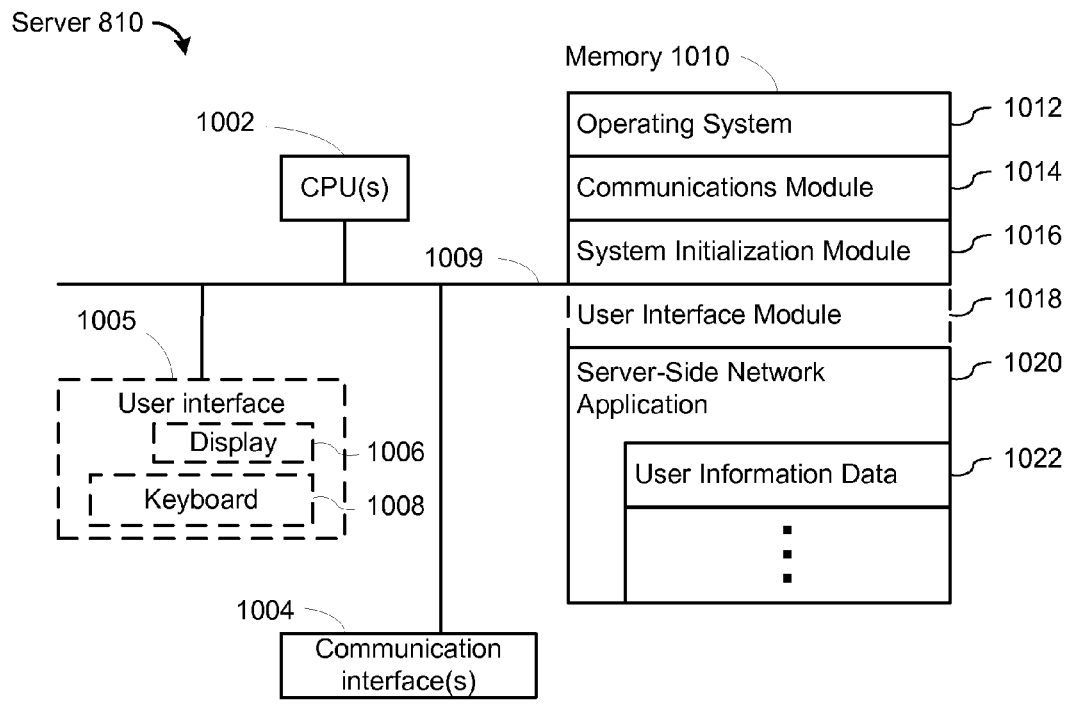
FIG. 10 is a block diagram of a server in accordance with some embodiments.

FIG. 10 is a block diagram of a server in accordance with some embodiments. The exemplary server 810 typically includes one or more processing units (CPU's) 1002, one or more network or other communications interfaces 1004, memory 1010, and one or more communication buses 1009 for interconnecting these components. The communication buses 1009 may include circuitry (sometimes called a chipset) that interconnects and controls communications between system components. The server 810 may optionally include a user interface 1005, for instance a display 1006 and a keyboard 1008. Memory 1010 may include high speed random access memory and may also include non-volatile memory, such as one or more magnetic disk storage devices. Memory 1010 may include mass storage that is remotely located from the CPU's 1002. In some embodiments, memory 1010 stores the following programs, modules and data structures, or a subset or superset thereof:

- an operating system 1012 that includes procedures for handling various basic system services and for performing hardware dependent tasks;
- a network communication module 1014 that is used for connecting the server 810 to other servers or client computers 830 via one or more communication networks (wired or wireless), such as the Internet, other wide area networks, local area networks, metropolitan area networks, and so on;
- a system initialization module 1016 that initializes other modules and data structures stored in the memory 1012 required for the appropriate operation of the server 810;
- an optional user interface module 1018 configured to receive user inputs through the user interface 1005; and
- one or more server-side network applications 1020, each network application further including user information data 1022 (e.g., a user identifier, a password, a user account balance, a current user status).

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for data synchronization, comprising:
    at a computer having one or more processors and memory storing programs executed by the one or more processors,
    receiving user input events associated with a network application, wherein each user input event corresponds to a respective image frame of the network application and the user input events include at least one remote user input event from a remote source;
    in response to receiving the user input events:
        generating and updating response data from the respective image frames associated with the user input events to a current image frame of the network application, including updating the response data corresponding to the respective image frames associated with the user input events at a first frame rate;
        rendering the current image frame on a graphical user interface of the network application using the response data;
        generating and updating synchronization data from the respective image frame associated with the at least one remote user input event to the current image frame of the network application, including generating initial synchronization data for the respective image frame associated with the at least one remote user input event and performing a frame-by-frame update to the initial synchronization data until a number of updates to the synchronization data is the same as a number of updates to the response data;
        replacing the response data that has already been used for rendering the graphical user interface with the synchronization data; and
        after rendering the current image frame using the response data, updating the current image frame on the graphical user interface using the synchronization data, wherein the network application running at the computer is in synchronization with the same network application running at other computers after updating the current image frame.

2. The method of claim 1, wherein performing the frame-by-frame update to the initial synchronization data until a number of updates to the synchronization data is the same as a number of updates to the response data further includes:
    updating the synchronization data corresponding to the respective image frame associated with the at least one remote user input event at a second frame rate;
    determining the number of updates to the synchronization data and the number of updates to the response data, respectively;
    if the number of updates to the synchronization data is the same as the number of updates to the response data, replacing the response data with the synchronization data; and
    otherwise, repeating the updating of the synchronization data.

3. The method of claim 2, wherein the second frame rate is greater than the first frame rate.

4. The method of claim 1, wherein the network application includes an online gaming application.

5. A computer system, comprising:
    one or more processors;
    memory including one or more program modules stored in the memory and configured for execution by the one or more processors for:
        receiving user input events associated with a network application, wherein each user input event corresponds to a respective image frame of the network application and the user input events include at least one remote user input event from a remote source;
        in response to receiving the user input events, generating and updating response data from the respective image frames associated with the user input events to a current image frame of the network application, wherein the response data is used for rendering the current image frame on a graphical user interface of the network application, including updating the response data corresponding to the respective image frames associated with the user input events at a first frame rate;

generating and updating synchronization data from the respective image frame associated with the at least one remote user input event to the current image frame of the network application, including generating initial synchronization data for the respective image frame associated with the at least one remote user input event and performing a frame-by-frame update to the initial synchronization data until a number of updates to the synchronization data is the same as a number of updates to the response data; and replacing the response data with the synchronization data, wherein the synchronization data is used for updating the current image frame on the graphical user interface after rendering the current image frame using the response data, and the network application running at the computer is in synchronization with the same network application running at other computers after the current image frame is updated.

6. The computer system of claim 5, wherein the instruction for performing the frame-by-frame update to the initial synchronization data until a number of updates to the synchronization data is the same as a number of updates to the response data further includes instructions for:

updating the synchronization data corresponding to the respective image frame associated with the at least one remote user input event at a second frame rate;

determining the number of updates to the synchronization data and the number of updates to the response data, respectively;

if the number of updates to the synchronization data is the same as the number of updates to the response data, replacing the response data with the synchronization data; and otherwise, repeating the updating of the synchronization data.

7. The computer system of claim 6, wherein the second frame rate is greater than the first frame rate.

8. The computer system of claim 5, wherein the network application includes an online gaming.

9. A non-transitory computer readable storage medium having stored therein one or more instructions, which, when executed by a computer system, cause the computer system to:

receive user input events associated with a network application, wherein each user input event corresponds to a respective image frame of the network application and the user input events include at least one remote user input event from a remote source;

in response to receiving the user input events:
generate and update response data from the respective image frames associated with the user input events to a current image frame of the network application, including updating the response data corresponding to the respective image frames associated with the user input events at a first frame rate;

render the current image frame on a graphical user interface of the network application using the response data;

generate and update synchronization data from the respective image frame associated with the at least one remote user input event to the current image frame of the network application, including generating initial synchronization data for the respective image frame associated with the at least one remote user input event and performing a frame-by-frame update to the initial synchronization data until a number of updates to the synchronization data is the same as a number of updates to the response data; and replace the response data that has already been used for rendering the graphical user interface with the synchronization data;

after rendering the current image frame using the response data, update the current image frame on the graphical user interface using the synchronization data, wherein the network application running at the computer is in synchronization with the same network application running at other computers after updating the current image frame.

10. The non-transitory computer readable storage medium of claim 9, wherein the instruction for performing the frame-by-frame update to the initial synchronization data until a number of updates to the synchronization data is the same as a number of updates to the response data further includes instructions for:

updating the synchronization data corresponding to the respective image frame associated with the at least one remote user input event at a second frame rate;

determining the number of updates to the synchronization data and the number of updates to the response data, respectively;

if the number of updates to the synchronization data is the same as the number of updates to the response data, replacing the response data with the synchronization data; and otherwise, repeating the updating of the synchronization data.

11. The non-transitory computer readable storage medium of claim 10, wherein the second frame rate is greater than the first frame rate.

12. The non-transitory computer readable storage medium of claim 9, wherein the network application includes an online gaming.

* * * * *